United States Patent
Kano

(10) Patent No.: US 9,161,002 B2
(45) Date of Patent: Oct. 13, 2015

(54) IMAGE CAPTURE APPARATUS, CONTROL METHOD, AND RECORDING MEDIUM RELATED TO BAYER STRUCTURE

(71) Applicant: CANON KABUSHIKI KAISHA, Tokyo (JP)

(72) Inventor: Masaaki Kano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/855,405

(22) Filed: Apr. 2, 2013

(65) Prior Publication Data
US 2013/0265462 A1   Oct. 10, 2013

(30) Foreign Application Priority Data
Apr. 10, 2012   (JP) ................. 2012-089676

(51) Int. Cl.
*H04N 9/73* (2006.01)
*H04N 9/07* (2006.01)
*H04N 5/232* (2006.01)

(52) U.S. Cl.
CPC ........... *H04N 9/735* (2013.01); *H04N 5/23229* (2013.01); *H04N 9/07* (2013.01)

(58) Field of Classification Search
None
See application file for complete search history.

(56) References Cited

U.S. PATENT DOCUMENTS

| 7,286,701 B2 * | 10/2007 | Muraki ................. 382/167 |
| 2008/0180556 A1 * | 7/2008 | Egawa ................. 348/294 |
| 2010/0067789 A1 * | 3/2010 | Cai et al. ............. 382/166 |
| 2010/0128142 A1 * | 5/2010 | Ichikawa ............. 348/223.1 |
| 2011/0069192 A1 * | 3/2011 | Sasaki ................. 348/222.1 |
| 2011/0234842 A1 * | 9/2011 | Ishiga ................. 348/223.1 |

FOREIGN PATENT DOCUMENTS

JP   2003-125209 A   4/2003

* cited by examiner

*Primary Examiner* — Albert Cutler
(74) *Attorney, Agent, or Firm* — Cowan, Liebowitz & Latman, P.C.

(57) ABSTRACT

An image capture apparatus generates a developed image by generating a signal intensity of an inexistent color component for an image signal of each pixel read from an image sensor having a Bayer pattern. The image capture apparatus corrects a color dispersion caused by the image sensor for the developed image and outputs the corrected developed image. And the image capture apparatus generates a Bayer image having the Bayer pattern from the corrected developed image.

16 Claims, 5 Drawing Sheets

F I G. 1
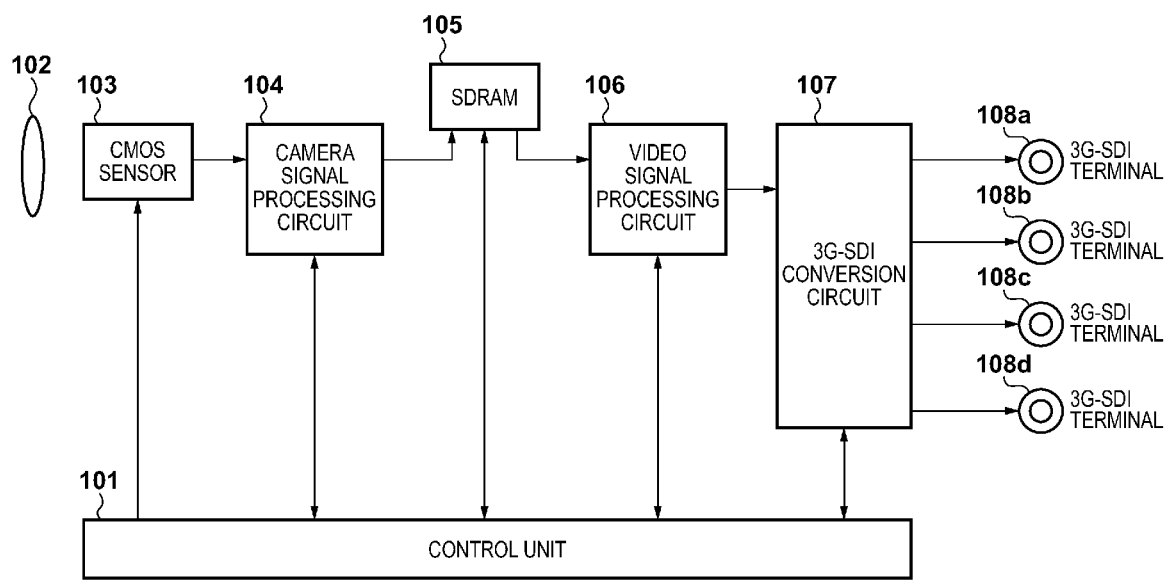

FIG. 3A INPUT OF SYNCHRONIZATION PROCESSING CIRCUIT 203
FIG. 3B OUTPUT OF SYNCHRONIZATION PROCESSING CIRCUIT 203
FIG. 3C OUTPUT OF COLOR MATRIX OPERATION CIRCUIT 205
FIG. 3D OUTPUT OF BAYER GENERATION UNIT 206, BAYER OUTPUT MODE OUTPUT OF SYNCHRONIZATION
PROCESSING CIRCUIT 203,
RGB OUTPUT MODE
AND YCbCr OUTPUT MODE OUTPUT OF COLOR MATRIX
OPERATION CIRCUIT 205,
RGB OUTPUT MODE
AND YCbCr OUTPUT MODE OUTPUT OF BAYER GENERATION UNIT 206,
RGB OUTPUT MODE
AND YCbCr OUTPUT MODE

IMAGE CAPTURE APPARATUS, CONTROL METHOD, AND RECORDING MEDIUM RELATED TO BAYER STRUCTURE

BACKGROUND OF THE INVENTION

1. Field of the Invention

The present invention relates to an image capture apparatus, a control method, and a recording medium and, particularly, to an image capture apparatus that includes an image sensor having a Bayer pattern and performs Bayer pattern image output and developed image output, a control method, and a recording medium.

2. Description of the Related Art

Some of image capture apparatuses such as digital cameras and digital video cameras not only develop the output signal of the image sensor, convert it into image data (normally compressed data) of a specific color space, and output the image data but also output RAW compressed data obtained by performing variable-length encoding of the output signal before development. Such RAW data cannot directly be viewed because it has not undergone development. On the other hand, the RAW data is very versatile because it has an information amount larger than that of developed compressed image data and can, for example, adjust an image to high quality of user's taste.

However, for the above-described two types of data compression processing, different circuits for the two types of compression processing need to be provided because the processing procedure and processing contents are different. Japanese Patent Laid-Open No. 2003-125209 discloses an image processing circuit configured to easily switch between a normal compression mode and a RAW compression mode.

In terrestrial TV broadcasting and the like, videos compliant with so-called full HD having 1920 (H)×1080 (V) pixels are distributed. Demand is recently increasing even for high-resolution images such as so-called over HD with pixels more than full HD (for example, 4K horizontal pixels×2K vertical pixels: K=1000). Some image capture apparatuses include an image sensor capable of outputting a high-resolution image. As the image sensor for outputting a high-resolution image, for example, a CCD or CMOS sensor having 4K horizontal pixels×2K vertical pixels of a Bayer structure in which color filers of four colors (R, Gr, Gb, and B) are arranged in a checkered pattern is employed.

If the image capture apparatus adopting the image sensor with the Bayer structure performs developed image output and non-developed image output like Japanese Patent Laid-Open No. 2003-125209 described above, the following problem may arise.

A non-developed image is output by applying white balance correction, defact correction processing, correction of light falloff at edges, or the like to the output signal of the image sensor. On the other hand, a developed image is output by further applying interpolation processing of performing synchronization of pixels from the pixel output of the Bayer pattern. In addition, because of variations in the spectral characteristics of the color filters employed in the image sensor or variations in the internal interlayer films of a CMOS sensor, an image developed using the output signal itself may include a color dispersion. Hence, for the developed image, color matrix correction processing of correcting the color dispersion is applied in addition to conversion to the image of a specific color space.

That is, since the presence/absence of application of color matrix correction processing changes between the developed image and the non-developed image, the color reproducibility changes for the obtained image output.

SUMMARY OF THE INVENTION

The present invention has been made in consideration of the problem of the related art. The present invention provides an image capture apparatus for outputting an image of uniform color reproducibility independently of the presence/absence of development, a control method, and a recording medium.

The present invention in its first aspect provides an image capture apparatus comprising: an image sensor having a Bayer pattern; a development unit configured to generate a developed image by generating a signal intensity of an inexistent color component for an image signal of each pixel read from the image sensor; a color correction unit configured to correct a color dispersion caused by the image sensor for the developed image generated by the development unit and output the corrected developed image; and a generation unit configured to generate a Bayer image having the Bayer pattern from the corrected developed image in which the color dispersion has been corrected by the color correction unit.

Further features of the present invention will become apparent from the following description of exemplary embodiments (with reference to the attached drawings).

BRIEF DESCRIPTION OF THE DRAWINGS

FIG. 1 is a block diagram showing an example of the arrangement of an image capture apparatus according to the present invention;

FIGS. 3A, 3B, 3C, 3D, 3E, 3F, and 3G are views showing examples of pixel structures in the respective modes of the camera signal processing circuit of the image capture apparatus according to the present invention.

DESCRIPTION OF THE EMBODIMENTS

First Embodiment

Figure 2:
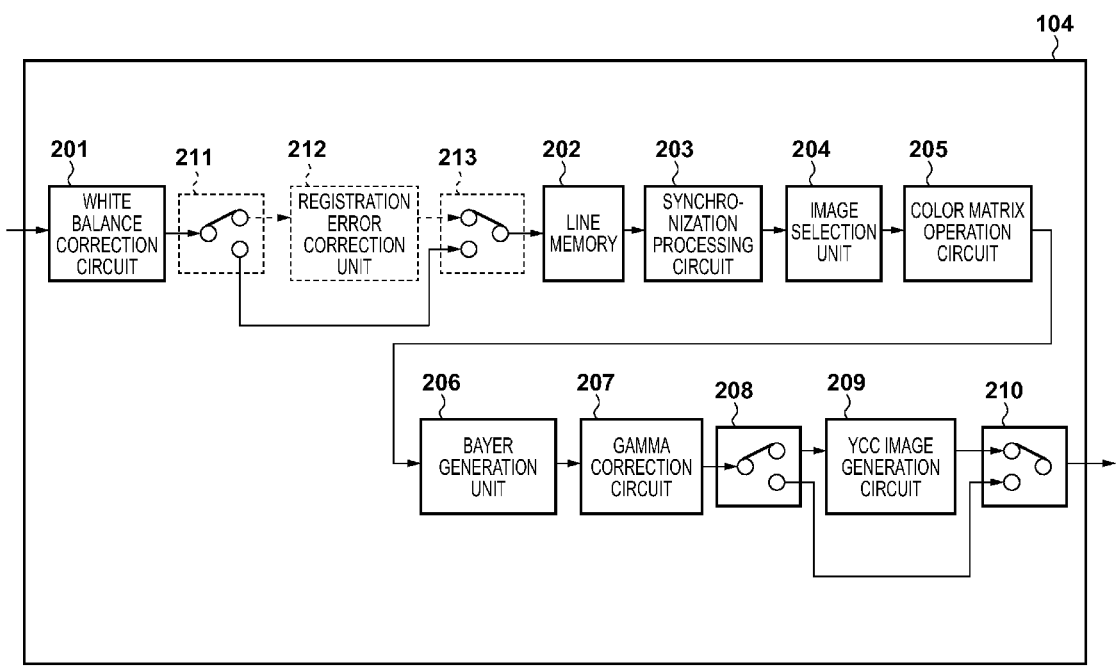
FIG. 2 is a block diagram showing an example of the arrangement of a camera signal processing circuit of the image capture apparatus according to the present invention.

An exemplary embodiment of the present invention will now be described in detail with reference to the accompanying drawings. Note that in the embodiment to be explained below, an example will be described in which the present invention is applied to a digital camera capable of outputting an image having a Bayer pattern and a developed image obtained by applying synchronization processing as an example of an image capture apparatus. However, the present invention is applicable to an arbitrary device capable of outputting an image having a Bayer pattern and a developed image obtained by applying synchronization processing.

<Arrangement of Digital Camera 100>

FIG. 1 is a block diagram showing the functional arrangement of a digital camera 100 according to the embodiment of the present invention.

A control unit 101 is formed from, for example, a CPU and controls the operation of each block of the digital camera 100. More specifically, the control unit 101 reads out an operation program of image capture processing (to be described later)

stored in a ROM (not shown), and extracts and executes the program on a RAM (not shown), thereby controlling the operation of each block.

A CMOS sensor 103 is an image sensor formed from two-dimensionally arranged charge-accumulation type photoelectric conversion elements (pixels). In the CMOS sensor 103, color absorbent materials that absorb light of different wavelengths and serve as color filters are provided on the upper surfaces of microlenses provided on the surfaces of the respective pixels. R (600 nm to 700 nm), Gr (500 nm to 600 nm), Gb (500 nm to 600 nm), and B (400 nm to 500 nm) color filters are applied to the pixels of the CMOS sensor 103 in a checkered pattern so as to form a Bayer pattern as shown in FIG. 3A. The CMOS sensor 103 performs photoelectric conversion and A/D conversion of an optical image formed on the sensor surface through an optical system 102, and outputs an image signal having the Bayer pattern. More specifically, the CMOS sensor 103 reads photoelectrically converted charges as the image signal by non-additional reading or vertical additional reading in synchronism with a timing signal output from the control unit 101, A/D-converts the image signal, and outputs it to a camera signal processing circuit 104.

In this embodiment, the CMOS sensor 103 has 4K (4096) horizontal pixels×2K (2160) vertical pixels (R pixels=Gr pixels=Gb pixels=B pixels=2048×1080). In this embodiment, the CMOS sensor will be exemplified as the image sensor. However, the present invention is not limited to this and is applicable to any image sensor that causes a color dispersion depending on variations in the spectral characteristics of the color filters when developing the image signal obtained in the above-described manner.

The camera signal processing circuit 104 applies various kinds of image processing to the input image signal and outputs corrected image data to an SDRAM 105. The digital camera 100 of this embodiment can switch the format of image data output from the camera signal processing circuit 104 in accordance with the output mode. The camera signal processing circuit 104 changes image processing in accordance with the set output mode. The digital camera 100 can set the following four output modes.

Bayer output mode: output a Bayer image (4096 horizontal pixels×2160 vertical pixels) having a Bayer pattern
  Interpolation RGB output mode: output a developed synchronized image (RGB image: 2048 horizontal pixels× 1080 vertical pixels) of the RGB space by applying synchronization processing to the image signal having the Bayer pattern output from the CMOS sensor
  YCbCr output mode: output a YCC image (2048 horizontal pixels×1080 vertical pixels) obtained by color-converting the synchronized image of the RGB space into the YCbCr space
  Parallel output mode: parallelly output the Bayer image and at least one of the RGB image and the YCC image A video signal processing circuit 106 reads out the image data stored in the SDRAM 105, rearranges the data to a signal arrangement complying with the SMPTE standard, and outputs it to a 3G-SDI conversion circuit 107.

The 3G-SDI conversion circuit 107 converts the input image data into a video signal corresponding to the SMTPE standard format that is the 3G-SDI standard, and outputs the converted video signal via 3G-SDI terminals 108a to 108d.

(Internal Arrangement of Camera Signal Processing Circuit 104)

The internal arrangement of the camera signal processing circuit 104 according to this embodiment will be described next in detail with reference to FIG. 2.

When the image signal (image data) having the Bayer pattern, which is output from the CMOS sensor 103, is input to the camera signal processing circuit 104, a white balance correction circuit 201 first applies white balance adjustment processing. The white balance correction circuit 201 adjusts the gain of each chrominance signal while referring to, for example, "white" image data captured in advance for adjustment so that R, G, and B have an intensity ratio of 1:1:1. The white balance correction circuit 201 outputs the image data that has undergone the white balance adjustment to a line memory 202 to store the data.

The line memory 202 performs interpolation processing particularly in the vertical direction for the input image data. As for the line memory 202, if the interpolation processing has, for example, vertical 11 taps, a 10-line memory is provided for each pixel. The line memory 202 outputs the image data after interpolation to a synchronization processing circuit 203.

The synchronization processing circuit 203 performs, for each pixel of the input image data, processing (synchronization processing) of generating and developing pixel data of inexistent colors. More specifically, for, for example, the pixel of an R signal, the synchronization processing circuit 203 generates the pixel data of G and B signals. The synchronization processing circuit 203 executes the synchronization processing on the basis of, for example, 11 horizontal pixels× 11 vertical lines. The image data (synchronized image) obtained by the synchronization processing of the synchronization processing circuit 203 has a structure as shown in FIG. 3B and includes 4096 horizontal pixels×2160 vertical pixels for each of R, G, and B.

Figure 3E:
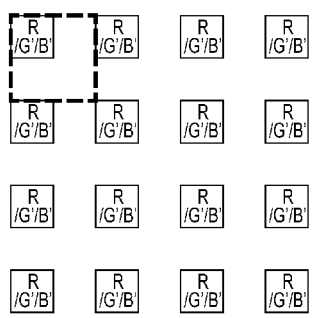

The synchronization processing circuit 203 of this embodiment outputs not only the synchronized image having 4096 horizontal pixels×2160 vertical pixels but also a reduced image having 2048 horizontal pixels×1080 vertical pixels generated from the image independently of the set output mode. More specifically, the synchronization processing circuit 203 thins the pixels of the synchronized image generated by the above-described method and having 4096 horizontal pixels×2160 vertical pixels to ¼, as shown in FIG. 3E, thereby generating and outputting a reduced image having 2048 horizontal pixels×1080 vertical pixels.

An image selection unit 204 selects one of the images output from the synchronization processing circuit 203 in accordance with the set output mode as an image to be transmitted to a color matrix operation circuit 205, and outputs the image. More specifically, when the Bayer output mode is set, the image selection unit 204 selects the synchronized image having 4096 horizontal pixels×2160 vertical pixels, which is output from the synchronization processing circuit 203, and outputs it to the color matrix operation circuit 205. When the interpolation RGB output mode or the YCbCr output mode is set, the image selection unit 204 selects the reduced image having 2048 horizontal pixels×1080 vertical pixels, which is output from the synchronization processing circuit 203, and outputs it to the color matrix operation circuit 205. When the parallel output mode is set, the image selection unit 204 selects the synchronized image and the reduced image output from the synchronization processing circuit 203, and outputs them to the color matrix operation circuit 205.

The color matrix operation circuit 205 corrects, in the synchronized image or the reduced image output from the synchronization processing circuit 203, a color dispersion caused by the variations in the color filters of the CMOS sensor 103. More specifically, the color matrix operation circuit 205 performs color correction by applying, to the input image data, a color matrix operation of 3 rows×3 columns represented by $$\begin{bmatrix} r \\ g \\ b \end{bmatrix} = \begin{bmatrix} a & b & c \\ d & e & f \\ g & h & i \end{bmatrix} \begin{bmatrix} R \\ G \\ B \end{bmatrix}$$

The coefficients are set so as to meet a+b+c=d+e+f=g+h+i=1.

When the matrix operation is expanded, the chrominance signals of the corrected synchronized image are given by $$r = a \times R + b \times G + c \times B$$

$$g = d \times R + e \times G + f \times B$$

$$b = g \times R + h \times G + i \times B$$

Figure 3F:
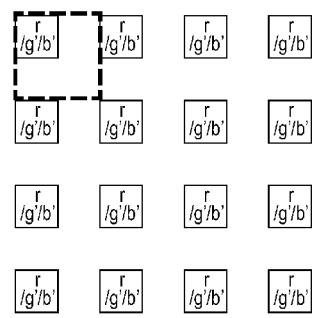

The corrected synchronized image, which has the r, g, and b pixel data, is output to a Bayer generation unit 206. That is, the color matrix operation circuit 205 outputs an image as shown in FIG. 3C as the corrected synchronized image when the Bayer output mode is set, or an image as shown in FIG. 3F when another output mode is set.

Figure 3G:
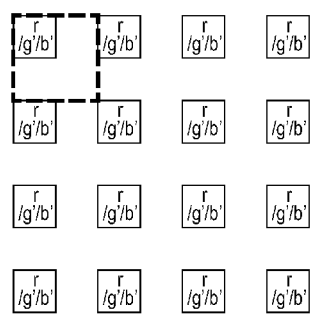

The Bayer generation unit 206 selectively outputs pixel data to be included in each pixel of the input image data in accordance with the set output mode. More specifically, when the interpolation RGB output mode or the YCbCr output mode is set, the Bayer generation unit 206 directly outputs the input image data, as shown in FIG. 3G.

On the other hand, when the Bayer output mode is set, the Bayer generation unit 206 selects one of the r, g, and b pixel data in accordance with each pixel position so that the output image data has the Bayer pattern, as shown in FIG. 3D. That is, the Bayer generation unit 206 selectively outputs r pixel data for a pixel existing at a position corresponding to an R pixel, g pixel data for a pixel existing at a position corresponding to a Gr or Gb pixel, and b pixel data for a pixel existing at a position corresponding to a B pixel.

When the parallel output mode is set, the Bayer generation unit 206 outputs the above-described image data having the Bayer pattern and the image data input to the Bayer generation unit 206.

A gamma correction circuit 207 multiplies the pixel data of each color of the image data output from the Bayer generation unit 206 by a gamma correction gain preset for the input signal level, thereby outputting image data that has undergone gamma correction. The gamma correction gain can be decided based on, for example, a gamma correction gain curve. A linear gamma that multiplies a predetermined gain independently of the input signal level or a log gamma gain curve represented by a logarithm may be used.

Switches 208 and 210 transmit the image data output from the gamma correction circuit 207 to a YCC image generation circuit 209 only when the YCbCr output mode is selected. The YCC image generation circuit 209 converts the synchronized image (reduced image) of the image data (2048 horizontal pixels×1080 vertical pixels) output from the gamma correction circuit 207 from the RGB color space to the YCbCr color space and outputs the image. More specifically, the YCC image generation circuit 209 generates Y, Cb, and Cr pixel data from the r, g, and b pixel data. After that, the YCC image generation circuit 209 performs sampling by applying a color difference low-pass filter (LPF) to the Cb and Cr signals, and outputs the image data.

As described above, the camera signal processing circuit 104 of this embodiment switches the image processing to be executed internally in accordance with the set output mode. A color dispersion is corrected after synchronization processing, and a Bayer image is generated from the corrected image and output. This allows to obtain uniform color reproducibility for the Bayer image, the RGB image, and the YCC image output from the camera signal processing circuit 104.

In addition, the processing can be the same independently of the output mode, except the processing of the Bayer generation unit 206. This allows to obviate the necessary of preparing a plurality of similar image processing circuits for each of the types of image data to be output, and reduce the circuit scale of the camera signal processing circuit 104.

Note that in the camera signal processing circuit 104 of this embodiment, the transmission rate is controlled to reduce the processing load of the matrix operation of the color matrix operation circuit 205.

For the image data having the Bayer pattern input to the synchronization processing circuit 203, four pixels corresponding to R, Gr, Gb, and B are input per clock. For this reason, if the pixel value of each pixel is, for example, 16 bits, the transmission rate is 16 bits×4 pixels=64 bits/clock.

On the other hand, in the processing performed by the synchronization processing circuit 203, pixel data of inexistent colors are generated for each input pixel by interpolation processing. For this reason, when the Bayer output mode is set, the transmission rate between the image selection unit 204 and the color matrix operation circuit 205 is 16 bits×3 colors×4 pixels=192 bits/clock.

To prevent the processing load from becoming heavy due to the matrix operation at a higher transmission rate, when the Bayer output mode is set, the color matrix operation circuit 205 divides four input pixels and causes four circuits to perform the operation as parallel processing. Hence, the transmission rate in the processing of each circuit of the color matrix operation circuit 205 is 48 bits/clock. The Bayer generation unit 206 selects pixel data of one color corresponding to the pixel position and inputs it to the gamma correction circuit 207. For this reason, the transmission rate to the gamma correction circuit 207 is 16 bits/clock.

On the other hand, when the interpolation RGB output mode or YCbCr output mode is set, the processing target is the reduced image generated by thinning. For this reason, the transmission rate between the image selection unit 204 and the color matrix operation circuit 205 is 16 bits×3 colors×1 pixel=48 bits/clock. In the color matrix operation circuit 205, the matrix operation is performed at 48 bits/clock using one of the four circuits. Since the same pixel data is input to the gamma correction circuit 207 as well, the transmission rate to the gamma correction circuit 207 is 48 bits/clock.

This makes it possible to control the transmission rate of processing in one circuit of the color matrix operation circuit 205 and the transmission rate to the gamma correction circuit 207 to a predetermined value or less. That is, it is possible to prevent the circuit scale of the color matrix operation circuit 205 from becoming unnecessarily large due to an increase in the transmission rate or the capacity of the RAM provided in the gamma correction circuit 207 from increasing.

In the parallel output mode, since the transmission rate can be reduced, the Bayer image of 4K and the RGB image of 2K can be generated without increasing the circuit scale.

This embodiment will be described assuming that the processing is implemented in each block provided in the digital camera 100 as hardware. However, the present invention is not limited to this, and the processing of each block may be implemented by a program that performs the same processing as that of the block.

<Image Capture Processing>

Figure 4:
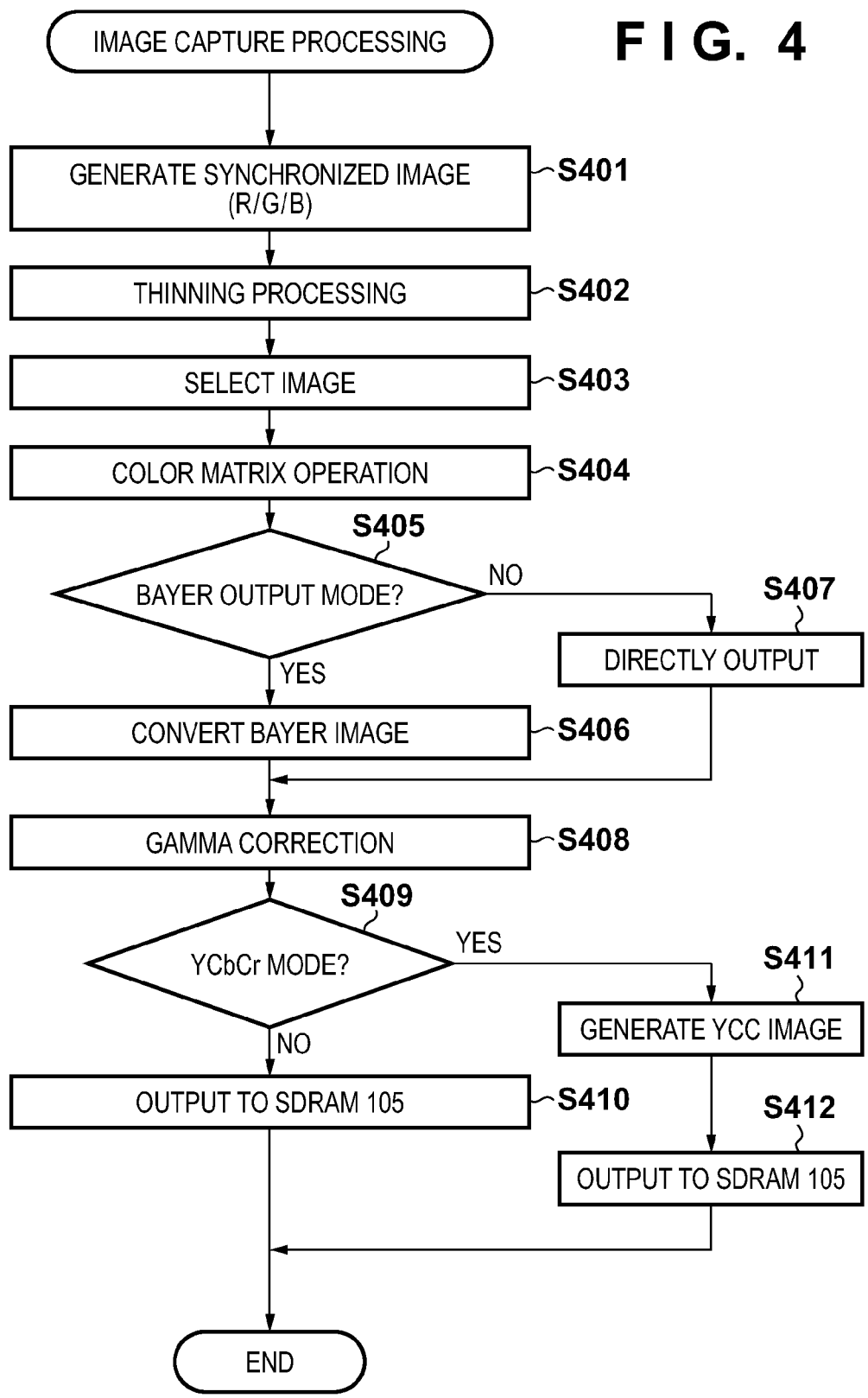
FIG. 4 is a flowchart showing an example of the operation procedure of the image capture apparatus according to the present invention.

Details of image capture processing of the digital camera 100 according to the embodiment having the above-described arrangement will be explained with reference to the flowchart of FIG. 4. Processing corresponding to the flowchart can be implemented by, for example, causing the control unit 101 to read out a processing program stored in a ROM (not shown) and extract and execute the program on a RAM. Note that the description will be made assuming that the image capture processing is started when, for example, the digital camera 100 is activated in a mode to perform image capture and repetitively executed for every frame.

In step S401, the control unit 101 causes the synchronization processing circuit 203 of the camera signal processing circuit 104 to generate a synchronized image and output it to the image selection unit 204. More specifically, the control unit 101 first causes the CMOS sensor 103 to capture an image, read the image signal by non-additional reading, and output the image data to the camera signal processing circuit 104. Then, the control unit 101 causes the white balance correction circuit 201 of the camera signal processing circuit 104 to execute white balance adjustment processing for the image data and then the line memory 202 to convert the image data into image data having a Bayer pattern. The control unit 101 causes the line memory 202 to output the image data having the Bayer pattern to the synchronization processing circuit 203, and causes the synchronization processing circuit 203 to generate a synchronized image having 4096 horizontal pixels×2160 vertical pixels by applying synchronization processing.

In step S402, the control unit 101 causes the synchronization processing circuit 203 of the camera signal processing circuit 104 to generate a reduced image having 2048 horizontal pixels×1080 vertical pixels by thinning the pixels of the generated synchronized image and output the reduced image to the image selection unit 204.

In step S403, the control unit 101 causes the image selection unit 204 to select processing target image data corresponding to the currently set output mode out of the input image data. More specifically, the image selection unit 204 receives the information of the output mode from the control unit 101 to the image selection unit 204 and selects the processing target image data in accordance with the information. That is, if the Bayer output mode is set, the image selection unit 204 selects the synchronized image. If the interpolation RGB output mode or the YCbCr output mode is set, the image selection unit 204 selects the reduced image. If the parallel output mode is set, the image selection unit 204 selects both the synchronized image and the reduced image. The image selection unit 204 outputs the selected processing target image data to the color matrix operation circuit 205.

In step S404, the control unit 101 causes the color matrix operation circuit 205 to execute the color matrix operation for the input image data to perform color correction and output the corrected image data to the Bayer generation unit 206.

In step S405, the control unit 101 determines whether the set output mode is the Bayer output mode. Upon determining that the set output mode is the Bayer output mode, in step S406, the control unit 101 causes the Bayer generation unit 206 to select one of r, g, and b pixel data in accordance with the pixel position and output the generated Bayer image having the Bayer pattern. Upon determining that the set output mode is the interpolation RGB output mode or the YCbCr output mode, in step S407, the control unit 101 causes the Bayer generation unit 206 to directly output the input image data. Note that if the parallel output mode is set, the control unit 101 causes the Bayer generation unit 206 to convert the synchronized image having 4096 horizontal pixels×2160 vertical pixels into a Bayer image and directly output the reduced image having 2048 horizontal pixels×1080 vertical pixels.

In step S408, the control unit 101 causes the gamma correction circuit 207 to apply gamma correction processing to the image output from the Bayer generation unit 206.

In step S409, the control unit 101 determines whether the set output mode is the YCbCr output mode. Upon determining that the set output mode is not the YCbCr output mode, in step S410, the control unit 101 causes the gamma correction circuit 207 to output the corrected image data to the SDRAM 105 and store the image data. Upon determining that the set output mode is the YCbCr output mode, in step S411, the control unit 101 selectively connects the switches 208 and 210 to output the image data corrected by the gamma correction circuit 207 to the YCC image generation circuit 209. The control unit 101 causes the YCC image generation circuit 209 to generate a YCC image from the gamma-corrected image data. In step S412, the control unit 101 causes the YCC image generation circuit 209 to output the generated YCC image to the SDRAM 105 and store the image. Note that if the parallel output mode is set, and setting is done to output the YCC image, the process of step S410 and the processes of steps S411 and S412 are executed.

As described above, the image capture apparatus according to this embodiment outputs images of uniform color reproducibility independently of the presence/absence of development. More specifically, the image capture apparatus generates a developed synchronized image by applying synchronization processing to an image signal read from an image sensor having a Bayer pattern. The color dispersion in the synchronized image caused by the image sensor is corrected, and a Bayer image having a Bayer pattern is generated from the corrected synchronized image.

Second Embodiment

In the above-described embodiment, the CMOS sensor 103 reads and outputs the image signal by non-additional reading. However, the reading method is not limited to this. In this embodiment, an image signal is read from a CMOS sensor 103 by, for example, vertical additional reading. A method of applying the present invention when performing image capture processing at a high frame rate will be described.

(Internal Arrangement of Camera Signal Processing Circuit 104)

A camera signal processing circuit 104 according to this embodiment further includes a switch 211, a registration error correction unit 212, and a switch 213 indicated by broken lines in FIG. 1 in addition to the arrangement of the first embodiment.

When an image signal is read from the CMOS sensor 103 by additional reading, the switches 211 and 213 change the path so as to input the image signal to the registration error correction unit 212. The registration error correction unit 212 includes a line memory and performs vertical interpolation processing using the pixels in the vertical direction while generating a Bayer structure by skipping every other line in the vertical direction.

Even when the image signal is read from the CMOS sensor 103 by additional reading, this allows the camera signal processing circuit 104 to convert the image into image data having a Bayer pattern and process it as in the first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-089676, filed Apr. 10, 2012, which is hereby incorporated by reference herein in its entirety.

What is claimed is:

1. An image capture apparatus comprising:
    an image sensor having a Bayer pattern;
    a development unit configured to generate a developed image based on signals read from said image sensor;
    a color correction unit configured to perform a color correction for the developed image and output a corrected developed image;
    a generation unit configured to generate a Bayer image having the Bayer pattern from the corrected developed image;
    a gamma correction unit configured to perform gamma correction processing for the corrected developed image or the Bayer image generated by said generation unit; and
    a change unit configured to change the performance of said gamma correction unit whether said gamma correction unit performs the gamma correction for the Bayer image after said color correction unit performs the color correction and said generation unit generates the Bayer image, or said gamma correction unit performs the gamma correction for the developed image without generating the Bayer image by said generation unit after said color correction unit performs the color correction.

2. The apparatus according to claim 1, wherein said development unit outputs the developed image and simultaneously generates a reduced image by decreasing the number of pixels of the developed image, and
    said color correction unit corrects a color dispersion even for the reduced image in addition to the developed image and output the corrected reduced image.

3. The apparatus according to claim 2, further comprising a control unit configured to control a transmission rate of processing of said color correction unit for the developed image and the reduced image generated by said development unit,
    said control unit causes said color correction unit to divide the developed image and perform parallel processing, thereby controlling the transmission rate of the processing of each of the divided developed images and the transmission rate of the processing of the reduced image to not more than a predetermined value.

4. The apparatus according to claim 1, wherein said image sensor comprises a CMOS sensor, and
    the apparatus further comprises an interpolation unit configured to, when the image signal is read from said image sensor by additional reading, interpolate the read image signal, thereby generating the image signal having the Bayer pattern.

5. The apparatus according to claim 1, wherein said development unit generates the developed image by generating a signal intensity of an inexistent color component for an image signal of each pixel read from said image sensor.

6. The apparatus according to claim 1, wherein said color correction unit corrects a color dispersion caused by said image sensor.

7. The apparatus according to claim 1, wherein said color correction unit performs the color correction by using a color matrix operation.

8. The apparatus according to claim 1, wherein said color correction unit corrects a R signal of the developed image based on a R signal, a G signal and B signal of the developed image.

9. The apparatus according to claim 1, wherein said color correction unit corrects a G signal of the developed image based on a R signal, a G signal and B signal of the developed image.

10. The apparatus according to claim 1, wherein said color correction unit corrects a B signal of the developed image based on a R signal, a G signal and B signal of the developed image.

11. The apparatus according to claim 1, further comprising a determination unit configured to determine that a mode set for the apparatus is a Bayer output mode in which the Bayer image is output,
    wherein, if said determination unit determines that the mode set for the apparatus is the Bayer output mode, said change unit changes the performance of said gamma correction unit such that the gamma correction is performed for the Bayer image after said color correction unit performs the color correction and said generation unit generates the Bayer image, and
    wherein, if said determination unit determines that the mode set for the apparatus is not the Bayer output mode, said change unit changes the performance of said gamma correction unit such that the gamma correction is performed for the developed image without generating the Bayer image by said generation unit after said color correction unit performs the color correction.

12. A control method of an image capture apparatus including an image sensor having a Bayer pattern, comprising:
    a development step of generating a developed image based on signals read from the image sensor;
    a color correction step of performing a color correction for the developed image step and output a corrected developed image;
    a generation step of generating a Bayer image having the Bayer pattern from the corrected developed image;
    a gamma correction step of performing gamma correction processing for the corrected developed image or the Bayer image generated in the generation step; and
    a change step of changing the performance of the gamma correction step whether the gamma correction is performed for the Bayer image in the gamma correction step after the color correction is performed in the color correction step and the Bayer image is generated in the generation step, or the gamma correction is performed for the developed image in the gamma correction step without generating the Bayer image in the generation step after the color correction is performed in the color correction step.

13. A computer-readable non-transitory recording medium recording a program for causing a computer to function as each unit of an image capture apparatus described in claim 1.

14. An image capture apparatus comprising:
an image sensor having a Bayer pattern;
a development unit configured to generate a developed image based on signals read from said image sensor;
a color correction unit configured to perform a color correction for the developed image and output a corrected developed image;
a generation unit configured to generate a Bayer image having the Bayer pattern from the corrected developed image; and
a control unit configured to control a transmission rate of processing of said color correction unit for the developed image,
wherein said control unit causes said color correction unit to divide the developed image and perform parallel processing, thereby controlling the transmission rate of the processing of each of the divided developed images to not more than a predetermined value.

15. A control method of an image capture apparatus including an image sensor having a Bayer pattern, comprising:
a development step of generating a developed image based on signals read from said image sensor;
a color correction step of performing a color correction for the developed image and outputting a corrected developed image;
a generation step of generating a Bayer image having the Bayer pattern from the corrected developed image; and
a control step of controlling a transmission rate of processing in the color correction step for the developed image,
wherein, in the said control step, the performance of the color correction step is caused to divide the developed image and to perform parallel processing, thereby controlling the transmission rate of the processing of each of the divided developed images to not more than a predetermined value.

16. A computer-readable non-transitory recording medium recording a program for causing a computer to function as each unit of an image capture apparatus described in claim 14.

* * * * *